United States Patent [19]

Horng

[11] Patent Number: 5,245,236
[45] Date of Patent: Sep. 14, 1993

[54] INDUSTRIAL HEAT DISSIPATING ELECTRIC FAN

[76] Inventor: Alex Horng, N. 149, Yi-Yung Rd., Lin Ya Dist., Kaohsiung, Taiwan

[21] Appl. No.: 919,260

[22] Filed: Jul. 27, 1992

[51] Int. Cl.$^5$ .................. H02K 7/14; H02K 11/00; H02K 5/04
[52] U.S. Cl. .................................. 310/67 R; 310/91
[58] Field of Search ............... 310/40 MM, 67 R, 62, 310/63, 89, 90, 91

[56] References Cited

U.S. PATENT DOCUMENTS

| | | | |
|---|---|---|---|
| 3,449,605 | 6/1969 | Wilson | 310/58 |
| 3,644,066 | 2/1972 | Heob et al. | 310/90 |
| 3,775,626 | 11/1973 | Burgbacher | 310/67 R |
| 3,914,071 | 10/1975 | Freise | 310/90 |
| 4,130,770 | 12/1978 | Wrobel | 310/67 R |
| 4,357,563 | 11/1982 | Ohno | 310/67 R |
| 4,612,468 | 9/1986 | Sturm et al. | 310/67 R |
| 4,636,669 | 1/1987 | Plunkett et al. | 310/67 R |
| 4,638,201 | 1/1987 | Feigel | 310/67 R |
| 4,760,298 | 7/1988 | Kitahara et al. | 310/67 R |
| 4,773,828 | 9/1988 | Hagiwara et al. | 310/67 R |
| 4,959,571 | 9/1990 | Yasumoto et al. | 310/67 R |
| 4,987,331 | 1/1991 | Horng | 310/67 R |
| 5,049,769 | 9/1991 | Reinhardt et al. | 310/67 R |
| 5,093,599 | 3/1992 | Horng | 310/67 R |
| 5,095,238 | 3/1992 | Suzuki et al. | 310/67 R |
| 5,128,571 | 7/1992 | Itsu | 310/67 R |

Primary Examiner—Steven L. Stephan
Assistant Examiner—C. LaBalle
Attorney, Agent, or Firm—Jacobson, Price, Holman & Stern

[57] ABSTRACT

An industrial heat dissipating electric fan comprising a metal shaft tube to combine with a stator, the metal shaft tube having an annular groove for inner projecting ridges of a central shaft tube of a housing base to engage to combine firmly and securely related components.

7 Claims, 5 Drawing Sheets

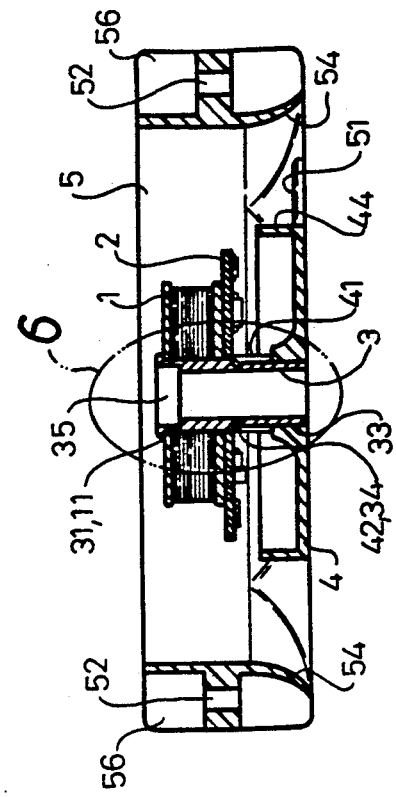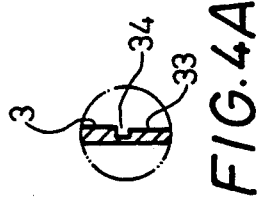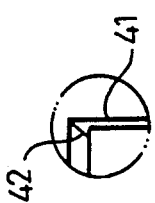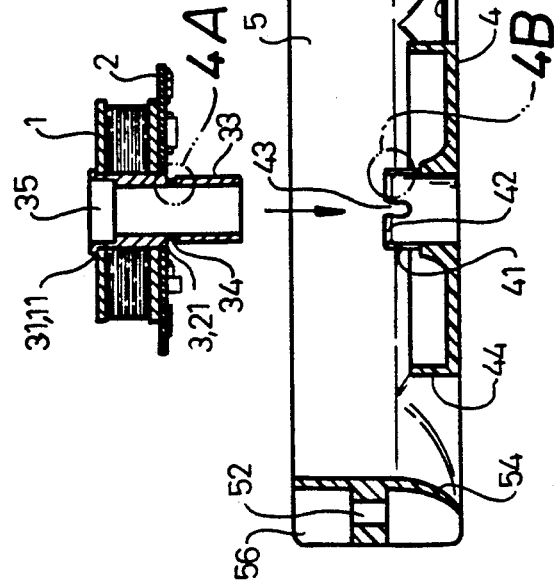

2

INDUSTRIAL HEAT DISSIPATING ELECTRIC FAN

BACKGROUND OF THE INVENTION

This invention concerns an industrial heat dissipating electric fan. There is a similar case titled "Non-brush D.C. Motor With New Improved Stator" of a U.S. Pat. No. 5,093,599 and of European Patent Application No. 91-10,399.2 by the same applicant of this invention, which comprises a stator base whose two side discs have notches and feet so that the polar plates can engage with. By expanding the thinner lips of the metal cylinder, the upper and lower polar plates can be fixed firmly with the stator base. The central shaft post of the housing base can pass through the inner perimeter of the metal cylinder.

The metal cylinder 5 is combined firmly with the plastic central shaft post 11, but the shaft post 11 become loose and falls off the metal cylinder 5 after a long period of use because of different expansion coefficient of the two different materials. Consequently, this heat dissipating electric fan using the above-mentioned motors has a short service life.

SUMMARY OF THE INVENTION

The object of this invention is to improve an industrial heat dissipating electric fan using an above-mentioned motor wherein a stator has a better structure, enabling a metal shaft tube can endure a long period of use not loosening off a plastic housing base with which the metal shaft tube is combined, lengthening service life of the fan.

The industrial heat dissipating electric fan in the present invention comprises a metal shaft tube to be combined with a stator, and the shaft tube has an annular groove for inner projecting ridges of a central shaft tube of a housing base to engage after the metal shaft tube is forcibly inserted in the central shaft tube so that related components can be firmly and securely combined together. And screw holes are provided in the housing base for screws to thread in and pass through for fixing the housing base on a wall of the like, being below the side surface of the housing base to let the screws not projecting out of the side surface.

BRIEF DESCRIPTION OF THE DRAWINGS

This invention will now be described in detail with reference to accompanying drawings wherein:

FIG. 4 is an inner cross-sectional view of the industrial heat dissipating electric fan in the present invention;

FIG. 4A is a magnified view of a part marked 4A in FIG. 4;

FIG. 4B is a magnified view of a part marked 4B in FIG. 4;

FIG. 5 is a cross-sectional view taken along line 5—5 of FIG. 3;

DETAILED DESCRIPTION OF THE INVENTION

Figure 1:
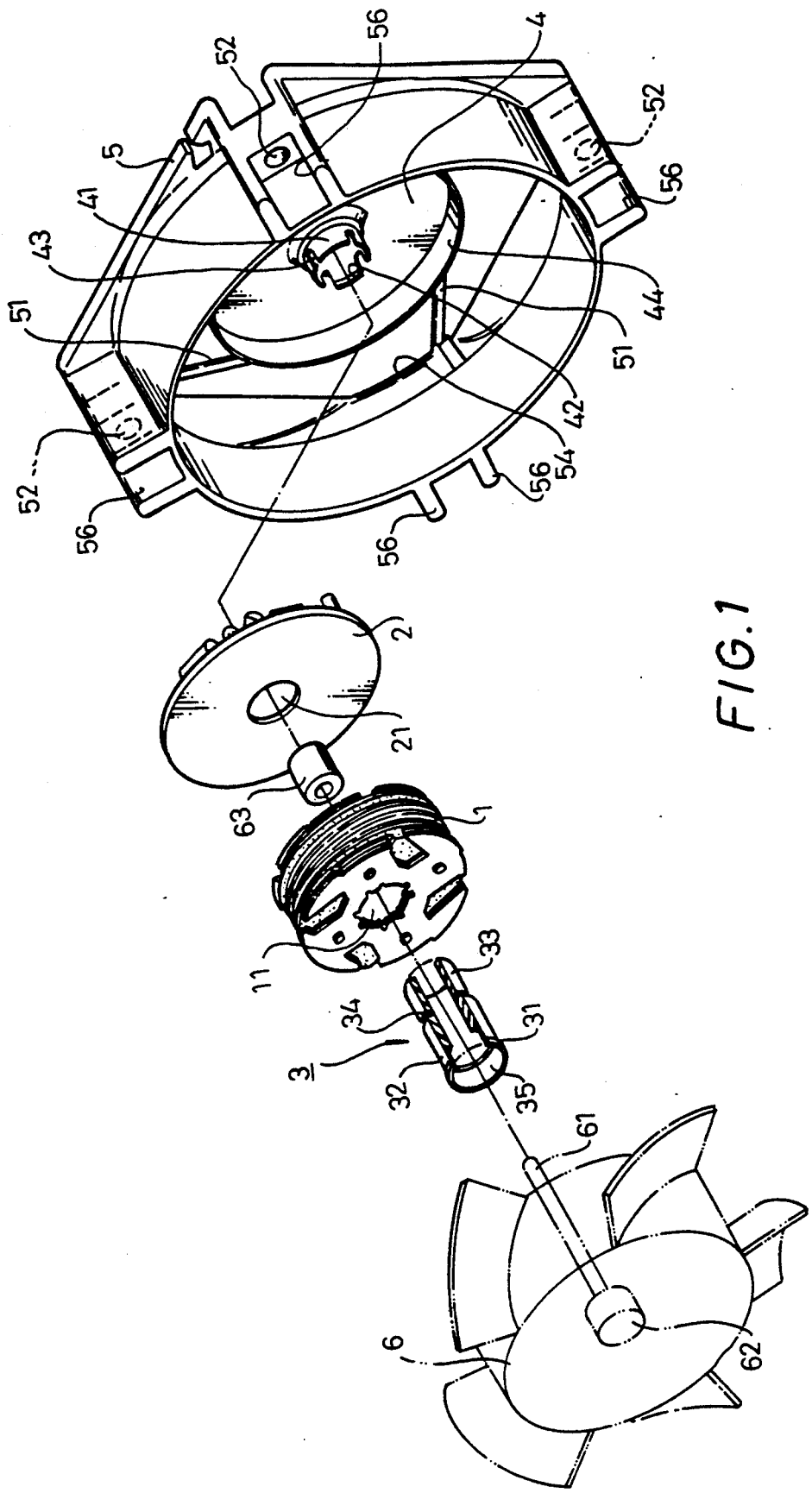
FIG. 1 is an exploded perspective view of an industrial heat dissipating electric fan in the present invention.
Figure 2:
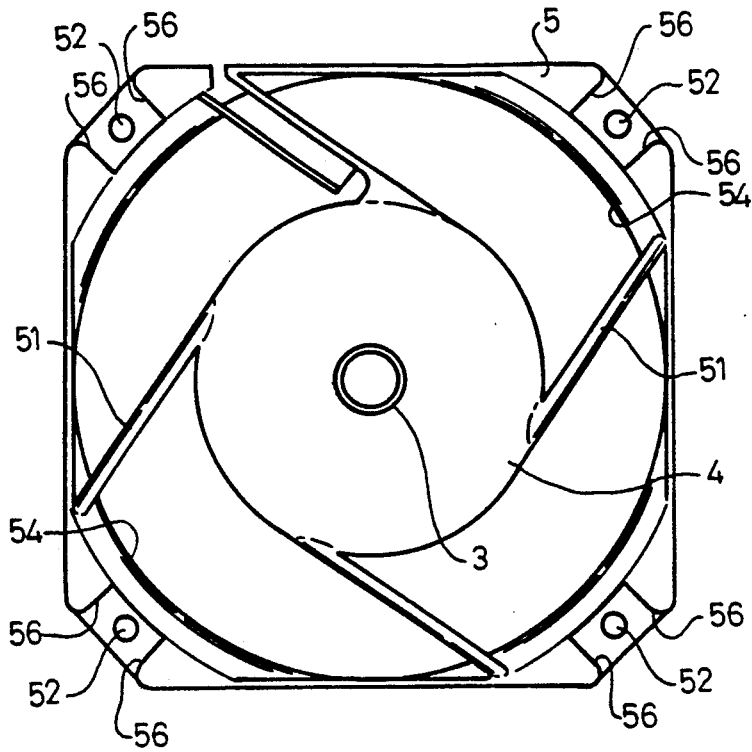
FIG. 2 is a rear view of the industrial heat dissipating electric fan in the present invention.
Figure 3:
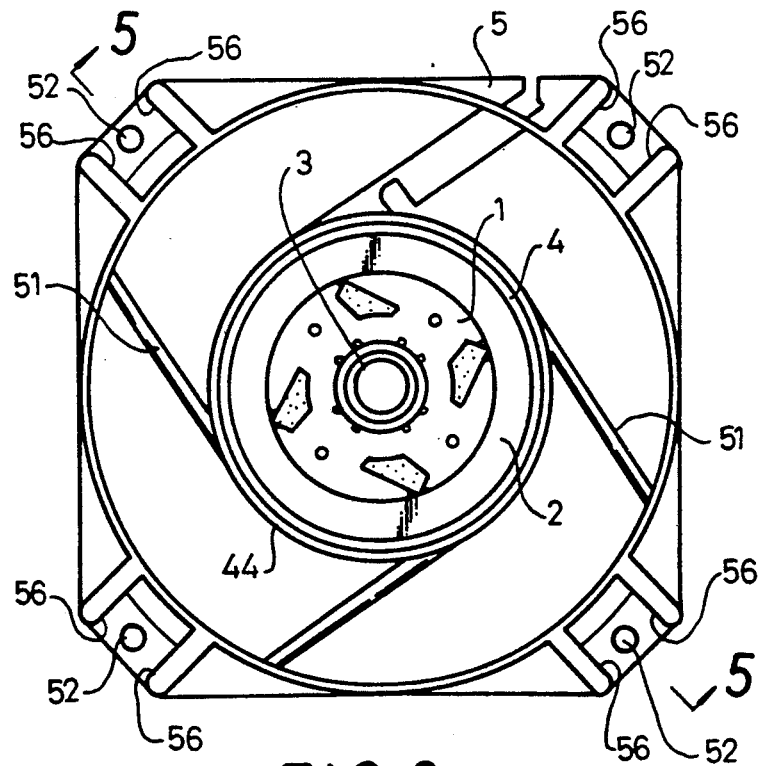
FIG. 3 is a front view of the industrial heat dissipating electric fan in the present invention.

An industrial heat dissipating electric fan in the present invention, as shown in FIG. 1, comprises a stator 1, a circuit board 2, a metal shaft tube 3, a shaft base 4 and a housing base 5.

The stator 1 consists of a plurality of polar pieces and a coil, having a shaft hole 11, the diameter of which is slightly smaller than the diameter of a large diameter portion 32 of the metal shaft tube 3, enabling the shaft hole 11 to fix firmly around the large diameter portion 32 thereof. The metal shaft tube 3 has a large diameter locating portion 31 to block the stator 1 keeping it in position.

The circuit board 2 has a central shaft hole 21, the diameter of which is also smaller than that of the large diameter portion 32 of the metal shaft tube 3, enabling the shaft hole 21 to fix firmly around the large diameter portion 32 thereof just as the shaft hole 11 in the stator 1 does.

The metal shaft tube 3 has a large diameter portion 32, a small diameter portion 33, an annular groove 34 between the both portions 32, 33, and a distal locating portion 31 abutting the large diameter portion 32. The locating portion 31 has an inner hole 35 for receiving a shaft seat 62 of a shaft 61 of a rotor 6, and a bearing 63 is received in a lower end of the inner hole 35. The large diameter portion 32 of the metal shaft tube 3 fits around the shaft hole 11 of the stator 1 and the small diameter portion 33 is slightly larger than an inner hole of the central shaft tube 41. Therefore, the small diameter portion 33 is forcibly inserted tightly in the inner hole of the central shaft tube 41 by means of pressing process. The annular groove 34 of the metal shaft tube 3 can engage with inner projecting ridges 42 provided in the central shaft tube 41 so that the related components can be combined together firmly and tightly.

The shaft base 4 has a central shaft tube 41, the inner diameter of which is smaller than that of the small diameter portion 33 of the metal shaft tube 3 so that the metal shaft tube 3 has to be forcibly inserted in the shaft tube 41 for combination of the both shaft tube 3 and 41. The central shaft tube 41 has several separating slots 43 equally spaced part in its peripheral wall, and the depth of each slot 43 is almost equal to the distance between each two neighboring slots 43, giving some resilience to the separated pieces of the wall of the shaft tube 41. Each piece of the wall has an inner projecting ridge 42 at its top to engage the annular groove 34 in the metal shaft tube 3. The shaft base 4 has an annular upright wall 44 around its outer periphery to reinforce combining strength of the central shaft tube 41 and further to diminish a gap between the shaft base 4 and the metal shaft tube 3 after the shaft base 4 is combined with the metal shaft tube 3. The annular upright wall 44 can be omitted.

The housing base 5 shown in FIGS. 2, 3, 4 and 5, has supporting rods 51 extending inward from its periphery to support the shaft base 4 at ends in position, screw holes 52 in its periphery equally spaced apart for fixing firmly the housing base 5 on a wall or the like. Each screw hole 52 is located between two walls 56, letting the head of a screw engaging in the screw hole 52 not protrude out of the lateral side surface of the housing base 5. The housing base 5 also has a wind exit defined by curved walls 54, which is useful for wind or air to flow out smoothly with noise as little as could be without causing turbulent current or circular current.

Figure 6:
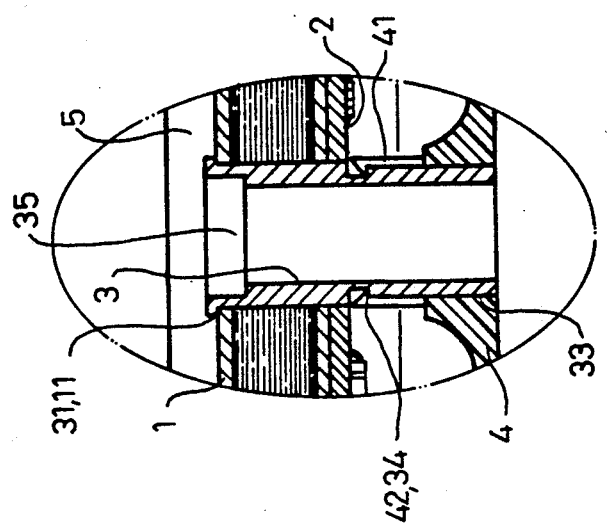
FIG. 6 is a cross-sectional view of a part marked 6 in FIG. 5.

Referring to FIGS. 5 and 6, the stator 1 is combined around the large diameter portion 32 of the metal shaft tube 3 and stabilized in position stopped by the distal locating portion 31. Then the small diameter portion 33 of the metal shaft tube 3 is forcibly inserted in the central shaft tube 41 of the housing base 5, with the inner projecting ridges 42 of the shaft tube 41 engaging the annular groove 34 of the metal shaft tube 3. Therefore, the related components are combined together in firm and stabilized condition.

Figure 7:
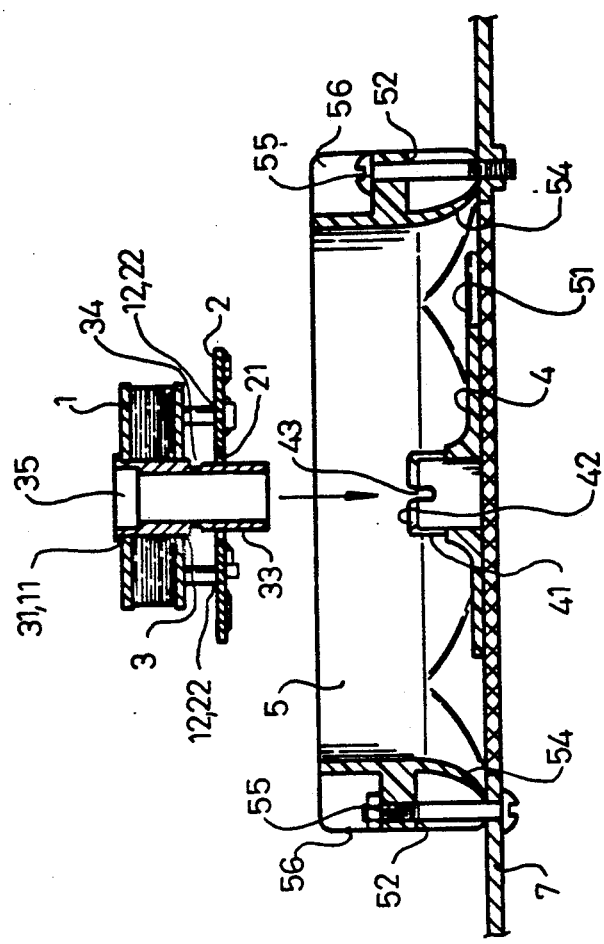
FIG. 7 is a cross-sectional view of another embodiment of the inner combination of the industrial heat dissipating electric fan in the present invention.

Another inner structural combination of this invention is shown in FIG. 7, wherein the circuit board 2 additionally has two round holes 22 for two additional feet 12 of the stator 2 to fit therein to combine the circuit board 2 with the stator 2. The central shaft hole 21 of the circuit board 2 is larger than the outer diameter of the central shaft tube 41, permitting the central shaft tube 41 to pass therethrough and the small diameter portion 33 of the metal shaft tube 3 to fit firmly in the central shaft tube 41.

Figure 8:
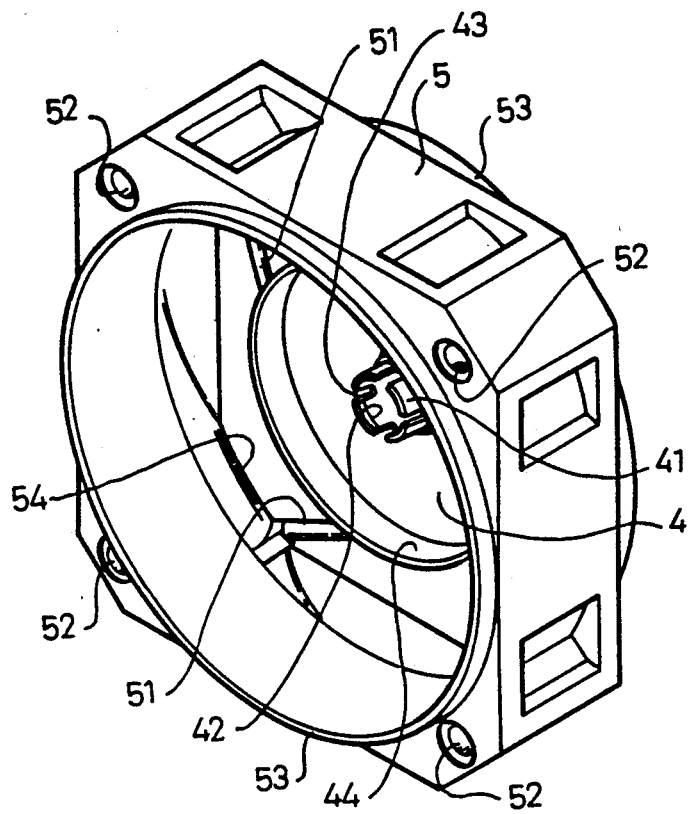
FIG. 8 is a perspective view of another embodiment of a housing base of the industrial heat dissipating electric fan in the present invention.
Figure 9:
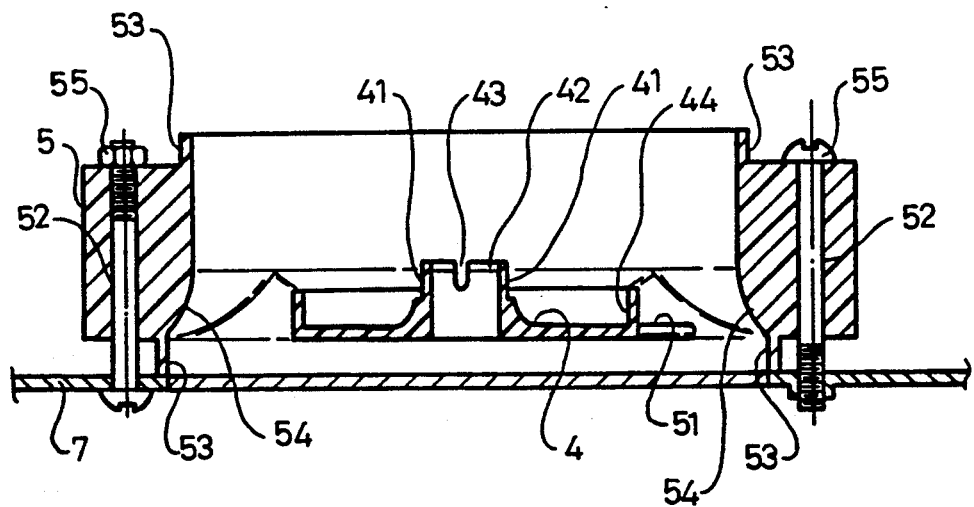
FIG. 9 is a cross-sectional view of another embodiment of the industrial heat dissipating electric fan in the present invention.

Another structure of the housing base 5 is shown in FIGS. 8 and 9. This housing base 5 additionally has two annular projecting edges 53 around a central hole on both lateral sides so as not to let screws 55 engaging in screw holes 52 protrude out of the side surface of the housing base 5 in fixing it with a cover plate 7.

The structure of the stator 1 in this invention surely obtains stabilized combination with other components, preventing the metal shaft tube 3 from loosening in relation to the plastic housing base 5 caused by heat expansion and cool shrinkage in a long period of use. And the configuration of the housing base can satisfy future need of light weight, easy fixing, smooth heat dissipation and less noise.

What is claimed is:

1. An industrial heat dissipating electric fan, comprising a circuit board and a stator, each having a central shaft hole for tightly receiving a large diameter portion of a metal shaft tube, said metal shaft tube also having a small diameter portion to be forcibly inserted in a central shaft tube in a shaft base, a housing base for housing other components of this fan having screw holes around its periphery for screws to engage therein to fix the housing base on a wall or the like, said metal shaft tube having a distal locating portion to stop and keep said stator in position and an annular groove for receiving inner projecting ridges disposed at a top end of the central shaft tube of said housing base, said top end of said central shaft tube abutting against said circuit board such that said circuit board and said stator are securely held between said distal locating portion and said top end of the central shaft tube whenever the annular groove receives the inner projecting ridges, wherein said reception of the inner projecting ridges in said annular groove serves to combine the stator, the circuit board, the metal shaft tube, the central shaft tube, the shaft base and the housing base tightly and securely.

2. The industrial heat dissipating electric fan as claimed in claim 1, wherein said housing base has an annular wall for the central shaft tube, and said annular wall is provided with several separating slots equally spaced apart.

3. The industrial heat dissipating electric fan as claimed in claim 1, wherein said housing base either has the screw holes respectively located between two walls or has two projecting annular edges around a central hole on both lateral sides, permitting tops of said screw holes to be below the side surface of the housing base to let screws passing through said screw holes not to protrude out of said side surface.

4. The industrial heat dissipating electric fan as claimed in claim 1, wherein said housing base has a wind exit defined by curved walls, and supporting rods extending from the housing base to the shaft base for fixing the shaft base coaxially with the housing base, said supporting rods having a round or oval post shape.

5. An industrial heat dissipating electric fan, comprising a circuit board and a stator, said stator having a central shaft hole for tightly receiving a large diameter portion of a metal shaft tube, said metal shaft tube also having a small diameter portion to be forcibly inserted in a central shaft tube in a shaft base, a housing base for housing other components of this fan having screw holes round its periphery for screws to engage therein to fix the housing base on a wall or the like, said circuit board having a central shaft aperture larger than the central shaft hole of said stator, said circuit board being coaxially arranged with the secured to said stator such that the central shaft aperture of said circuit board surrounds said central shaft tube of the shaft base, said metal shaft tube having a distal locating portion to stop and keep said stator in position and an annular groove for receiving inner projecting ridges disposed at a top end of the central shaft tube of said housing base, said top end of said central shaft tube abutting against said stator such that said stator is securely held between said distal locating portion and said top end of the central shaft tube whenever the annular groove receives the inner projecting ridges, wherein said reception of the inner projecting ridges in said annular groove serves to combine the stator, the circuit board, the metal shaft tube, the central shaft tube, the shaft base and the housing base tightly and securely.

6. The industrial heat dissipating electric fan as claimed in claim 5, wherein said housing base has an annular wall for the central shaft tube, and said annular wall is provided with several separating slots equally spaced apart.

7. The industrial heat dissipating electric fan as claimed in claim 5, wherein said housing base either has the screw holes respectively located between two walls or has two projecting annular edges around a central hole on both lateral sides, permitting tops of said screw holes to be below the side surface of the housing base to let screws passing through said screw holes not to protrude out of said side surface.

* * * * *